(12) United States Patent
Matsunaga et al.

(10) Patent No.: US 11,493,074 B2
(45) Date of Patent: Nov. 8, 2022

(54) LOOSENING DETECTION STRUCTURE AND LOOSENING DETECTION METHOD USING SAID STRUCTURE

(71) Applicant: Nippon Telegraph and Telephone Corporation, Tokyo (JP)

(72) Inventors: Eri Matsunaga, Musashino (JP); Tadashi Minotani, Musashino (JP); Masahito Nakamura, Musashino (JP); Masayuki Tsuda, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 3 days.

(21) Appl. No.: 17/289,059

(22) PCT Filed: Oct. 15, 2019

(86) PCT No.: PCT/JP2019/040506
§ 371 (c)(1),
(2) Date: Apr. 27, 2021

(87) PCT Pub. No.: WO2020/090446
PCT Pub. Date: May 7, 2020

(65) Prior Publication Data
US 2021/0404502 A1    Dec. 30, 2021

(30) Foreign Application Priority Data
Oct. 29, 2018  (JP) .............................. JP2018-202918

(51) Int. Cl.
*F16B 31/02*    (2006.01)
*G01H 17/00*    (2006.01)

(52) U.S. Cl.
CPC ............. *F16B 31/02* (2013.01); *G01H 17/00* (2013.01)

(58) Field of Classification Search
None
See application file for complete search history.

(56) References Cited

U.S. PATENT DOCUMENTS

2011/0138918 A1* 6/2011 Zagrai ................ G01N 29/2437
73/588

OTHER PUBLICATIONS

Tomotsugu Sakai et al., *Measurement of Bolt Axial Force Using Ultrasonic Waves*, Proceedings of the Japan Society of Mechanical Engineers, vol. 43, No. 366, 1977, pp. 723-729.

* cited by examiner

*Primary Examiner* — Raul J Rios Russo
*Assistant Examiner* — Carl F. R. Tchatchouang
(74) *Attorney, Agent, or Firm* — Workman Nydegger

(57) ABSTRACT

A looseness detection structure configured to detect looseness between a bolt and a nut that fix two components including a conductive film configured to be attached on a surface of the component, the surface of the component including a hole into which the bolt is inserted, the conductive film being attached such that the conductive film is not directly conductive to the component, a part of the conductive film having a dimension relating to a half wavelength of a high-frequency signal propagating inside the components, and a non-conductive film between a surface of the component and the conductive film in a case where surfaces of the components are conductors, and a second conductive film on a surface of the component in a case where the surfaces of the components are insulators, the second conductive film being opposite to the conductive film.

6 Claims, 8 Drawing Sheets

LOOSENING DETECTION STRUCTURE AND LOOSENING DETECTION METHOD USING SAID STRUCTURE

TECHNICAL FIELD

The present invention relates to a looseness detection structure for detecting looseness between a bolt and a nut that fix two components and a looseness detection method using the structure.

BACKGROUND ART

Bolts fasten and fix components and are used for various purposes from large-scale facilities such as infrastructural structures and plant facilities to everyday products such as vehicles, play equipment, and furniture. Joints of bolts are compositionally deformed by vibrations or excessive forces or deteriorate due to fatigue, which can cause such bolts to be loosened or dropped out.

This results in, for example, a collapse accident of a bridge, leakage of gas and liquid from a joint, breakage of play equipment, and an injury or fatal accident due to an object falling from a high place. To prevent such accidents, there are test methods such as a method of putting matching marks on bolts and monitoring a deviation between the matching marks, a hammering test, and a test method using ultrasonic waves (Non Patent Literature 1).

CITATION LIST

Non Patent Literature

Non Patent Literature 1: SAKAI Tomotsugu and two others, "Measurement of Axial Force Using Ultrasonic Waves," Journal of Japan Society of Mechanical Engineers Vol. 43, No. 366 (1977).

SUMMARY OF THE INVENTION

Technical Problem

However, the method of monitoring a deviation between the matching marks and the hammering test are not appropriate for testing a part that is difficult to visually check due to a test target being at a place at which it cannot be easily seen or far away. In addition, there is a problem in that such methods require skills, and that it is difficult for unskilled persons to perform the tests.

In addition, the test method using ultrasonic waves is performed with a measuring device carried to a place where it is difficult to conduct the test, such as a high place, and thus the cost becomes high. In addition, there is a problem in that conducting the test method in this manner is dangerous. In this way, the related art has a problem in that there is no structure nor method that is appropriate for testing looseness of portions of two components fastened with bolts.

The present invention has been made in view of the problems described above, and an object thereof is to provide a looseness detection structure that is appropriate for testing looseness of portions of two components fastened with a bolt and a looseness detection method using the structure.

Means for Solving the Problem

A looseness detection structure according to an aspect of the present invention is a looseness detection structure configured to detect looseness between a bolt and a nut fixing two components, the looseness detection structure including: a conductive film configured to be attached on a surface of a first component of the components, the surface of the first component including a hole into which the bolt is inserted, the conductive film being attached such that the conductive film is not directly conductive to the first component, a part of the conductive film having a dimension relating to a wavelength of a high-frequency signal propagating inside the components; a non-conductive film between a surface of the first component and the conductive film in a case where surfaces of the components are conductors; and a second conductive film on a surface of a second component of the components in a case where the surfaces of the components are insulators, the second conductive film being opposite to the conductive film.

A looseness detection method according to an aspect of the present invention is a looseness detection method executed by a looseness detection device configured to detect looseness between a bolt and a nut, the looseness detection method including: sweeping and applying a high-frequency signal at a frequency in a predetermined range to a conductive film configured to be attached on a surface of a first component of components, the surface of the first component including a hole into which the bolt is inserted, the conductive film being attached such that the conductive film is not directly conductive to the first component, a part of the conductive film having a dimension relating to a wavelength of the high-frequency signal propagating inside the components; detecting a vibration mode of the first component to which the conductive film is attached; recording a peak value of a vibration detected in the detecting; comparing the peak value with the peak value in the past and obtaining an amount of change; and determining that the looseness is not present in a case where the amount of change is smaller than a threshold and determining that the looseness is present in a case in which the amount of change is equal to or larger than the threshold.

Effects of the Invention

The present invention can provide a looseness detection structure that is appropriate for testing looseness of portions of two components fastened with a bolt and a looseness detection method using the structure can be provided.

BRIEF DESCRIPTION OF DRAWINGS

FIG. 6(*a*) is a plan view, and FIG. 6(*b*) is a diagram illustrating a resonance frequency spectrum.

FIG. 7(*a*)

is a plan view.

FIG. 8 is a diagram illustrating further another example of the looseness detection structure illustrated in FIG. 1.

DESCRIPTION OF EMBODIMENTS

Hereinafter, embodiments of the present invention will be described with reference to the drawings. The same portions in a plurality of the drawings are denoted by the same reference signs, and a description thereof will not be repeated.

Looseness Detection Structure

Figure 1:
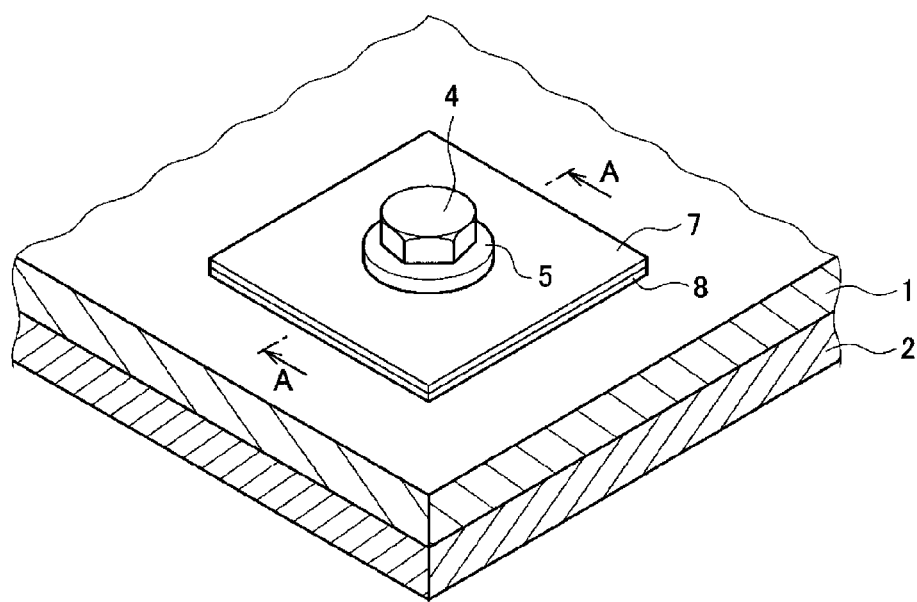
FIG. 1 is a perspective view illustrating an example of a looseness detection structure according to an embodiment of the present invention.

FIG. 1 is a perspective view illustrating an example of a looseness detection structure according to an embodiment of the present invention. The looseness detection structure 100 illustrated in FIG. 1 is used for detecting looseness between a bolt 4 and a nut 5 that fix two components 1 and 2.

In the example illustrated in FIG. 1, the components 1 and 2 are steel members. The structure for fixing the two components 1 and 2 is not limited to this example. A plurality of the bolts 4 may be provided. The two steel members may be fixed with a splice plate (not illustrated in the drawing) interposed therebetween. A washer 5 may not be provided. Hereinafter, a description of the washer 5 will be omitted.

Figure 2:
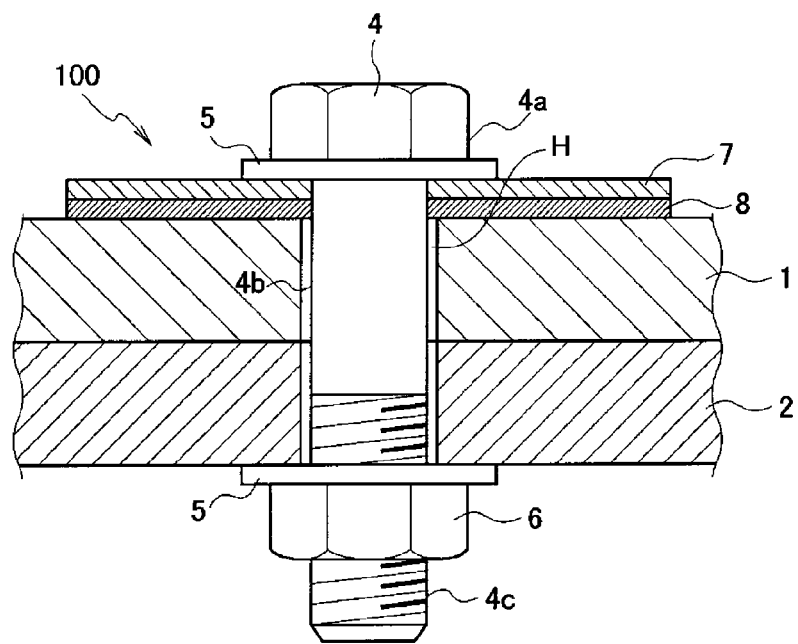
FIG. 2 is a cross-sectional view of the structure taken along line A-A illustrated in FIG. 1.

FIG. 2 is a cross-sectional view of the structure taken along line A-A illustrated in FIG. 1. As illustrated in the cross-sectional view of FIG. 2, a conductive film 7, a non-conductive film 8, a component (steel member) 1, a component (steel member) 2, and a nut 6 are provided from the top. The bolt 4 is inserted into a hole H formed in both of the components 1 and 2, and the nut 6 is fitted to a threaded portion 4c of the bolt 4 protruding from the opposite side, so that the components 1 and 2 are fixed.

The conductive film 7 may be formed by applying a conductive coating material. For example, as the conductive coating material, silver paste or the like can be used. The non-conductive film 8 may also be formed by applying a coating material. For example, a modified epoxy resin coating or the like can be used. In addition, the conductive film 7 may be formed by attaching a conductive sheet. As the conductive sheet, a film containing a conductive filler such as metal particles or carbon can be used.

As illustrated in FIG. 2, a neck portion 4a of the bolt 4 is not directly brought into contact with the component 1. In addition, the diameter of the bolt 4 is smaller than the diameter of the hole H, and thus, normally, the bolt 4 and the components 1 and 2 are not electrically conductive. When the bolt 4 is inserted eccentrically into the hole H, the bolt 4 may be brought into contact with the hole H. In a case where such contact is expected, a neck-below portion 4b of the bolt 4 may be coated.

In other words, the bolt 4 and the components 1 and 2 are not directly conductive. As a result, the bolt 4 and the components 1 and 2 are electrically conductive via the nut 6. In a case where the surfaces of the components 1 and 2 are conductors, conduction is formed in the path of the conductive film 7, the bolt 4, the nut 6, the component 2, and the component 1.

In addition, in a case where the surfaces of the components 1 and 2 are insulators or have low conductivity, the non-conductive film 8 is unnecessary. Instead, a conductive film (second conductive film) 9 (not illustrated) is also provided on the side of the nut 6. For example, the planar shape and the thickness of the second conductive film 9 are the same as those of the conductive film 7.

In this way, the looseness detection structure 100 according to this embodiment is a structure in which a high-frequency signal propagates to the two components 1 and 2 via the conductive film 7. Alternatively, the looseness detection structure 100 is a structure in which a high-frequency signal propagates through the two components 1 and 2 interposed between the conductive film 7 and the second conductive film 7.

Figure 3:
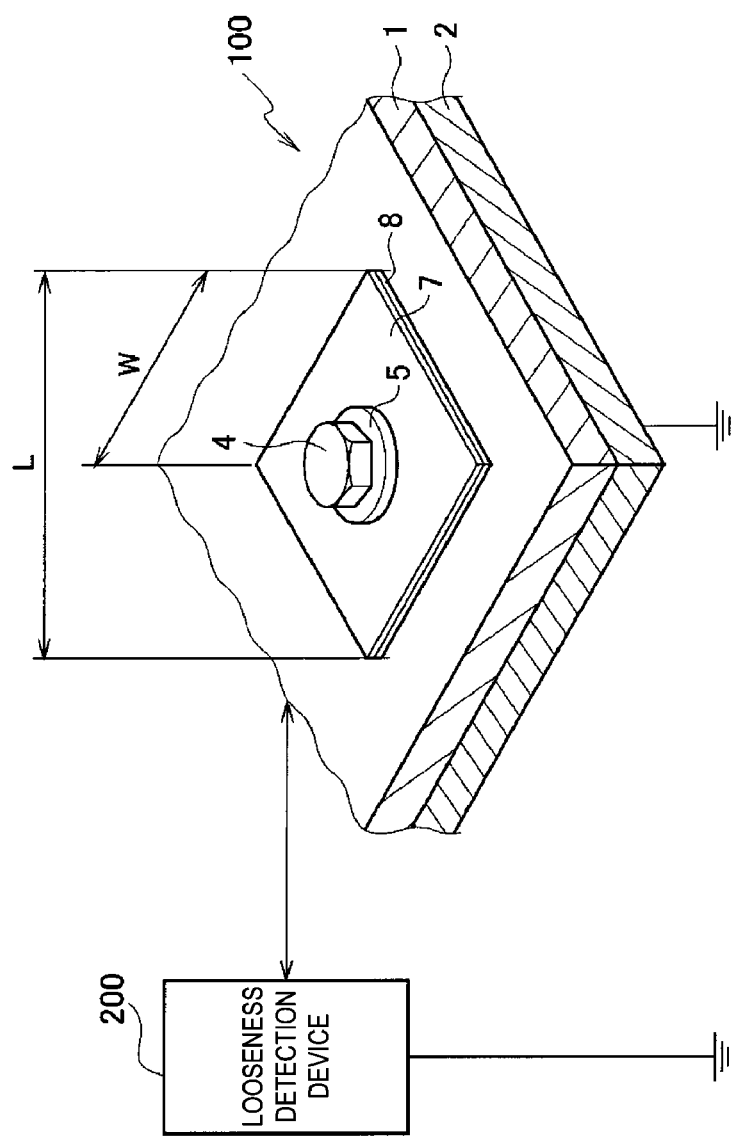
FIG. 3 is a schematic view illustrating the looseness detection structure and a looseness detection device according to an embodiment of the present invention.

FIG. 3 is a schematic view illustrating the looseness detection structure 100 and the looseness detection device 200 according to this embodiment. The looseness detection device 200 inputs a high-frequency signal to the conductive film 7 and detects natural frequencies of the components 1 and 2.

As illustrated in FIG. 3, the planar shape of the conductive film 7 is, for example, a quadrangle. A length of one side of the quadrangle will be denoted by W (hereinafter, one side W), and a length of a diagonal line will be denoted by L (hereinafter, a diagonal line L).

By associating the diagonal line L and the one side W of the conductive film 7 with a wavelength λ of a high-frequency signal input from the looseness detection device 200, the components 1 and 2 vibrate. The wavelength λ is a wavelength in the medium of each of the components 1 and 2.

The wavelength λ of the high-frequency signal is set as represented in Equation (1). The one side W is also represented by using the same equation W=λ/2×n. Here, n is an integer. A specific example of the diagonal line L and the one side W will be described below.

Math. 1

$$L = \frac{\lambda}{2} \times n \quad (1)$$

Here, n is an integer equal to or larger than 1.

The example illustrated in FIG. 3 is a case where the components 1 and 2 are steel members. Thus, the conductive film 7 to which a high-frequency signal is input is insulated by the non-conductive film 8. Then, the high-frequency signal propagates to the component 2 and the component 1 via the bolt 4 and the nut 6. A range in which a high-frequency signal mainly propagates is within the range of the components 1 and 2 to which the conductive film 7 is attached.

Propagation characteristics thereof change in accordance with looseness conditions of the bolt 4. Thus, the looseness detection structure 100 of this embodiment can test looseness of portions of the two components fastened with the bolt.

As described above, the looseness detection structure 100 according to this embodiment is a looseness detection structure for detecting looseness between the bolt 4 and the nut 6 that fix the two components 1 and 2, the looseness detection structure including the conductive film 7 a part of which has a dimension relating to the wavelength λ of a high-frequency signal propagating inside the components 1 and 2 and which is attached on the surface of the component 1 including the hole H, into which the bolt 4 is inserted, such that the conductive film 7 is not directly conductive to the component 1.

In addition, in a case where the surfaces of the components 1 and 2 are conductors, the looseness detection structure 100 according to this embodiment includes the non-conductive film 8 between the surface of the component 1 and the conductive film 7. Furthermore, in a case where the surfaces of the components 1 and 2 are insulators, the looseness detection structure 100 according to this embodiment includes the second conductive film 9, which is opposite to the conductive film 7, on the surface of the component 2. Here, the insulators also include lowly conductive objects.

In addition, the planar shape of the conductive film 7 is a quadrangle, and the dimension of the diagonal line L of the quadrangle is an integer multiple (n) of a half wavelength $\lambda/2$ of the high-frequency signal, or the dimension of the one side W of the quadrangle is an integer multiple (n) of the half wavelength $\lambda/2$ of the high-frequency signal.

In this way, the looseness detection structure 100 according to this embodiment can detect looseness between portions of the two components 1 and 2 fastened with the bolt 4.

Looseness Detection Device

Figure 4:
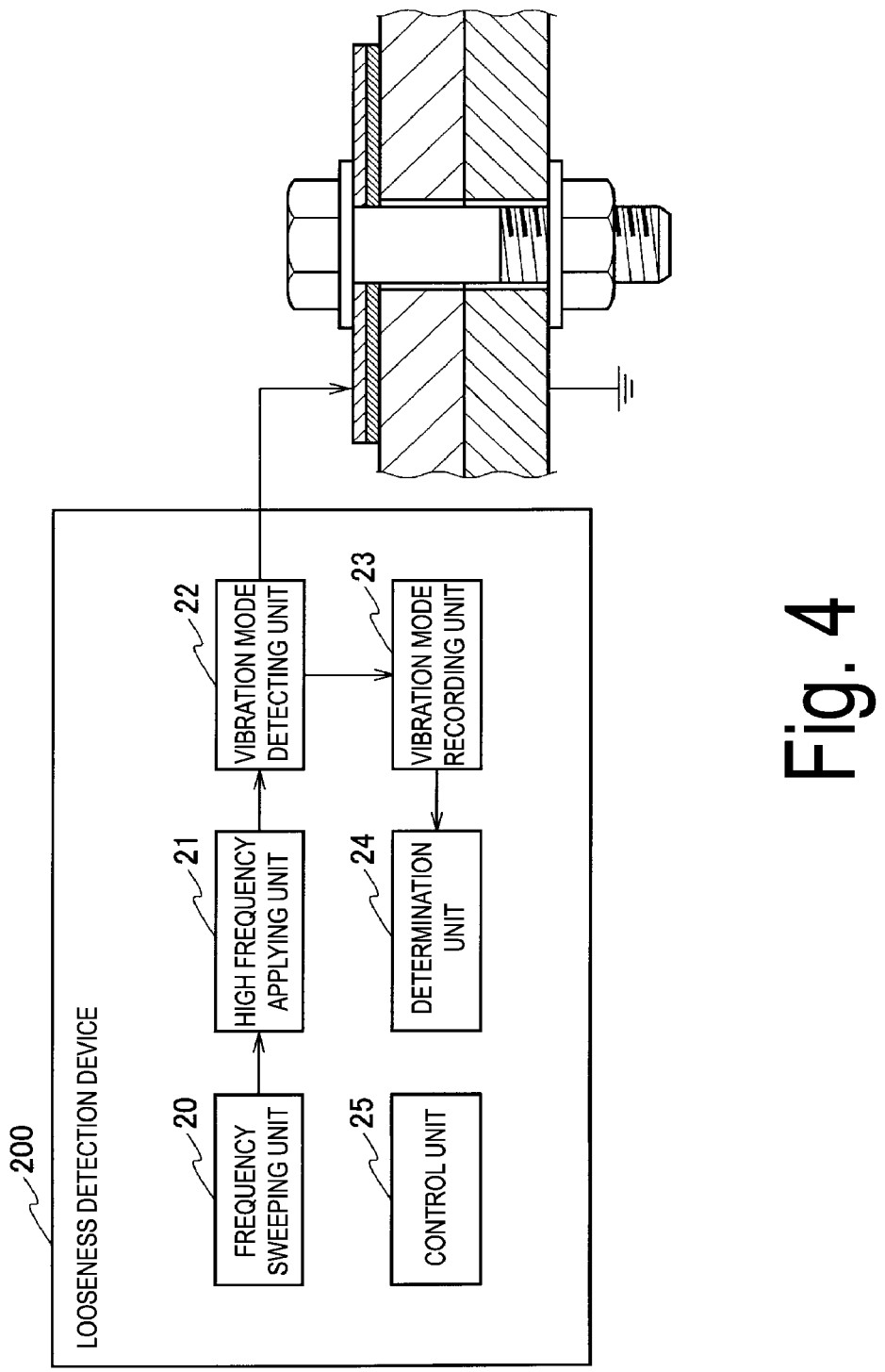
FIG. 4 is a block diagram illustrating an example of a functional configuration of the looseness detection device illustrated in FIG. 3.
Figure 5:
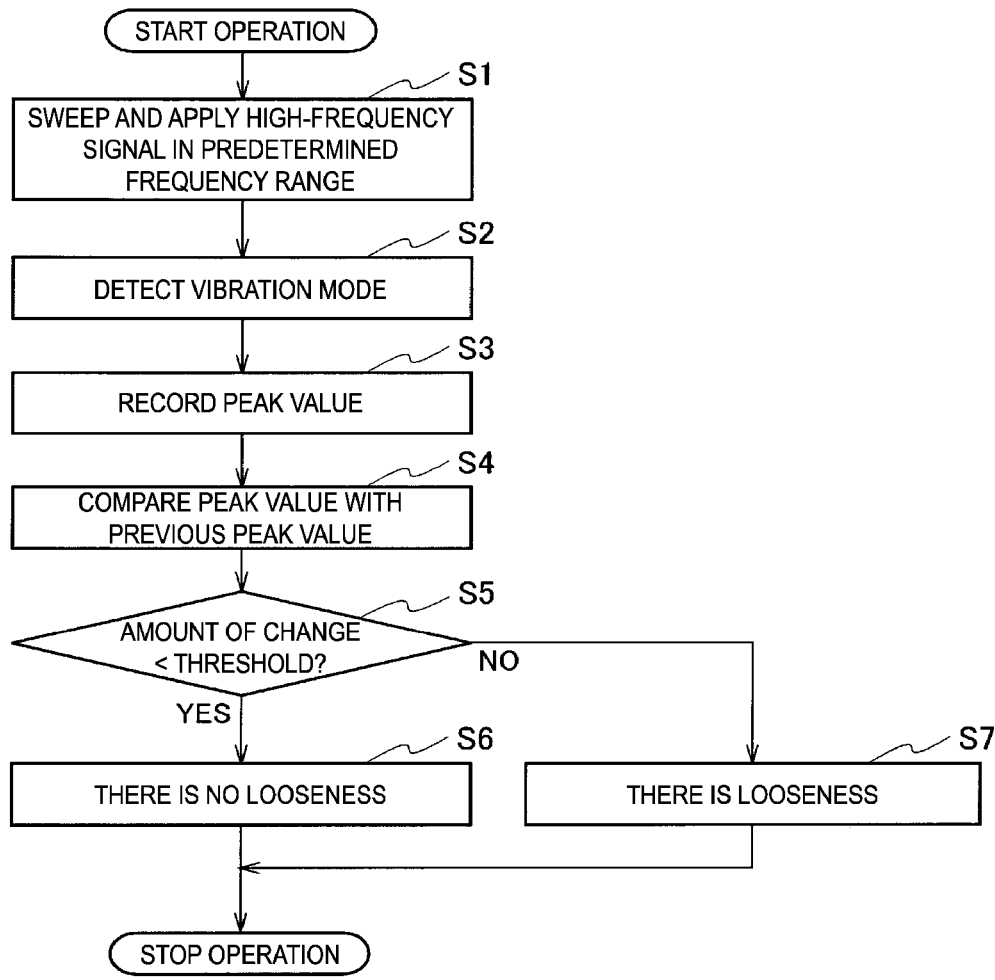
FIG. 5 is a flowchart of a processing procedure of the looseness detection device illustrated in FIG. 3.

FIG. 4 is a block diagram illustrating an example of the functional configuration of the looseness detection device 200 according to the embodiment of the present invention. A flowchart of a processing procedure thereof is illustrated in FIG. 5.

The looseness detection device 200 includes a frequency sweeping unit 20, a high-frequency applying unit 21, a vibration mode detecting unit 22, a vibration mode recording unit 23, a determination unit 24, and a control unit 25. The control unit 25 is a functional configuration unit that controls an operation of each of the functional configuration units and, for example, can be configured by a computer including a ROM, a RAM, a CPU, and the like. In a case where the control unit 25 is implemented by a computer, a component of the vibration mode detecting unit 22, the vibration mode recording unit 23, and the determination unit 24 may also be configured by the computer.

The looseness detection device 200 inputs a high-frequency signal to the conductive film 7 of the looseness detection structure 100. The frequency sweeping unit 20 sweeps a frequency in a predetermined range. The high-frequency applying unit 21 generates a high-frequency signal at a frequency swept by the frequency sweeping unit 20 and applies the generated high-frequency signal to the conductive film 7 of the looseness detection structure 100 (step S1).

The vibration mode detecting unit 22 detects a vibration mode of the components 1 and 2 to which the conductive film 7 is attached (step S2). The vibration mode can be acquired, for example, by performing a fast Fourier transform (FFT) on the characteristics of a current input to the conductive film 7.

Alternatively, the vibration mode may be detected by performing a fast Fourier transform on a reflective wave reflected from the conductive film 7. In a case where the vibration mode is detected from the reflective wave, the vibration mode detecting unit 22 is connected in series between the conductive film 7 and the vibration mode recording unit 23 (not illustrated in the drawing). A specific example of the vibration mode will be described below.

The vibration mode recording unit 23 records a peak value of the vibration detected by the vibration mode detecting unit 22 (step S3). The peak value of the vibration, for example, can be obtained based on a maximum value of a current input from the conductive film 7. The peak value, for example, is represented using a current value and a frequency at which the current flows.

First, the determination unit 24 compares the acquired peak value with a peak value acquired in the past and obtains an amount of change (step S4). For example, the amount of change may be changes in the current value and the frequency or may be only a change in the frequency.

Then, the determination unit 24 determines that there is no looseness in a case where the amount of change is smaller than a threshold (step S6) and determines that there is a looseness in a case where the amount of change is equal to or larger than the threshold (step S7). A specific example of the determination of looseness will be described below.

As described above, the looseness detection method executed by the looseness detection device 200 according to this embodiment includes a high-frequency sweeping and applying step S1 of sweeping and applying a high-frequency signal at a frequency in a predetermined range to the conductive film 7 attached on the surface of the component 1 including the hole H, into which the bolt 4 is inserted, such that the conductive film 7 is not directly conductive to the component 1, a part of the conductive film 7 having a dimension relating to the wavelength $\lambda$ of the high-frequency signal propagating inside the components 1 and 2, a vibration mode detecting step S2 of detecting a vibration mode of the component 1 to which the conductive film 7 is attached, a peak value recording step S3 of recording a peak value of a vibration detected in the vibration mode detecting step, a comparison step S4 of comparing the peak value with the peak value in the past and obtaining an amount of change, and a determination step S5 of determining that the looseness is not present in a case where the amount of change is smaller than a threshold and determining that the looseness is present in a case in which the amount of change is equal to or larger than the threshold.

In this way, looseness between portions of the two components 1 and 2 fastened with the bolt 4 can be detected.

Specific Example 1

Figure 6A:
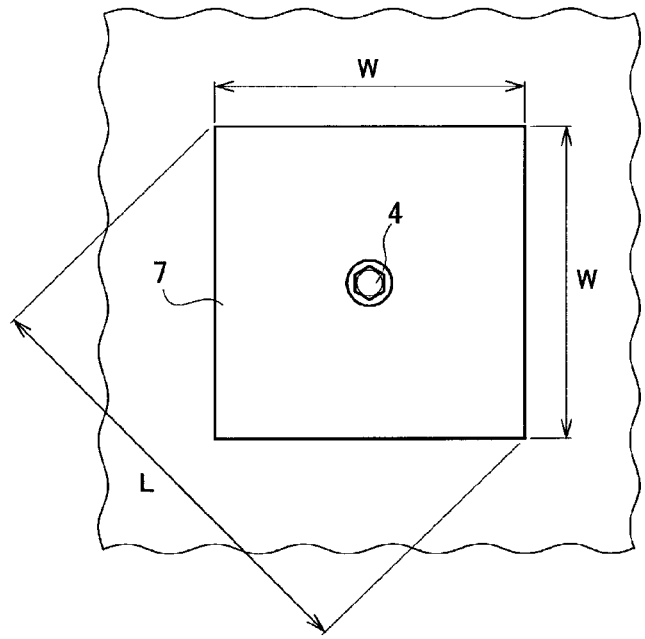
FIG. 6 is a diagram illustrating an example of the looseness detection structure illustrated in FIG. 1.
Figure 6B:
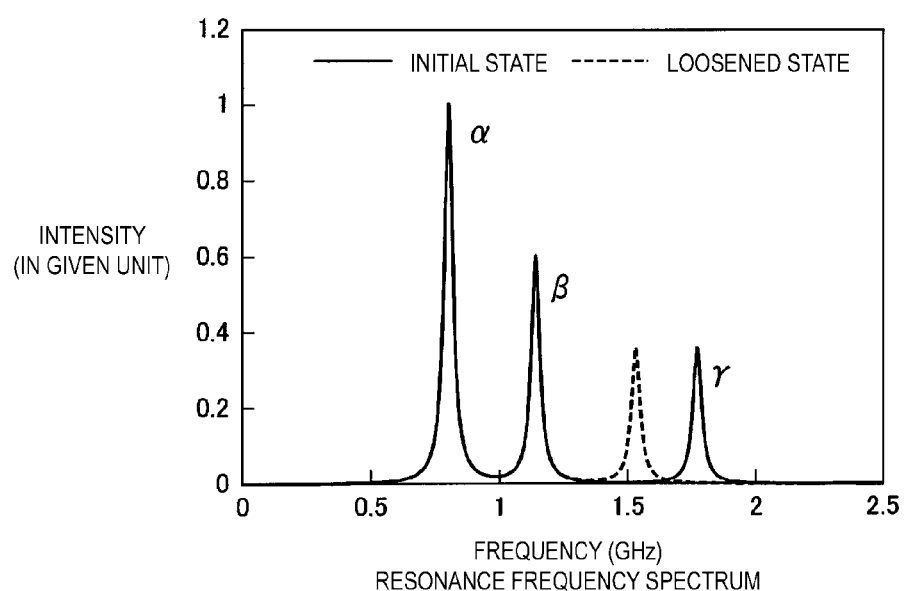

FIG. 6 is a diagram illustrating an example of the looseness detection structure 100. FIG. 6(a) is a plan view thereof, and FIG. 6(b) illustrates a power spectrum of a resonance frequency. In FIG. 6(b), the horizontal axis represents the frequency (GHz), and the vertical axis represents the intensity (in a given unit).

The conductive film 7 has a square shape, and the one side W is 10 cm. Thus, the diagonal line L was about 14.1 cm.

The diameter of the bolt 4 is smaller than 1/50 (28.2 mm) of the diagonal line L, which is nearly equal to 14.1 cm.

The high-frequency signal is swept from 0 GHz to 2.5 GHz.

In an initial state in which the bolt 4 is fastened, the components 1 and 2 around the bolt 4 form a shorted circuit, and thus, an electric field in the vicinity thereof is zero. In this case, a high-frequency signal is swept up to a frequency causing a vibration mode in which the position of the bolt 4 does not correspond to a node of the vibration. In other words, the amplitude is originally low at the node of the vibration. Thus, a high-frequency signal is swept up to a frequency at which the position of the bolt 4 corresponds an antinode of the vibration having a high amplitude.

As illustrated in FIG. 6(b), when a high-frequency signal is swept in the range of 0 GHz to 2.5 Hz, a plurality of peaks are observed. For example, three vibration peak values on the low frequency side will be considered. A solid line represents the vibration characteristics in an initial state in which the bolt 4 is fastened.

A lowest first harmonic α has a frequency (0.8 GHz) at which resonance occurs with the diagonal line L being the half wavelength λ/2. An intermediate second harmonic β has a frequency (1.14 GHz) at which resonance occurs with the one side W being the half wavelength λ/2. A highest third harmonic γ has a frequency (1.77 GHz) at which resonance occurs with the diagonal line L being the wavelength λ.

The second harmonic is 1.43 times the first harmonic α. This is approximately equal to a value obtained by dividing the diagonal line L by the one side W, which is 1.41. In addition, the third harmonic is 2.21 times the first harmonic α. This is approximately equal to twice 0.8 GHz. It is conceivable that the ratios of the harmonics are not accurately equal to the dimensional ratios because of an influence of leakage of the high-frequency signal and the like.

The characteristics represented by a broken line in FIG. 6(b) indicate a peak value of the vibration in a state in which the bolt 4 is loosened. Only the frequency of the third harmonic γ is changed to 1.53 GHz. The reason is considered to be that the amplitude by the third harmonic γ corresponding to an antinode of the vibration increases due to loosening of the bolt 4, and the frequency decreases.

In this way, the looseness of the bolt 4 can be detected using a change in the peak value of the vibration mode. The looseness of the bolt 4 is detected using a change in the peak value of the vibration mode, and thus it is only requested that frequencies swept in the high frequency sweeping and applying step S1 described above be in a frequency range including the first harmonic α to the third harmonic γ.

In other words, in the high frequency sweeping and applying step S1, a frequency range is swept, which includes a frequency of the high-frequency signal at which the dimension of the diagonal line L of the quadrangle corresponds to the half wavelength λ/2 and a frequency that is twice this frequency. This enables the frequency sweeping range to be a minimum necessary range and improves the test efficiency.

Specific Example 2

Figure 7A:
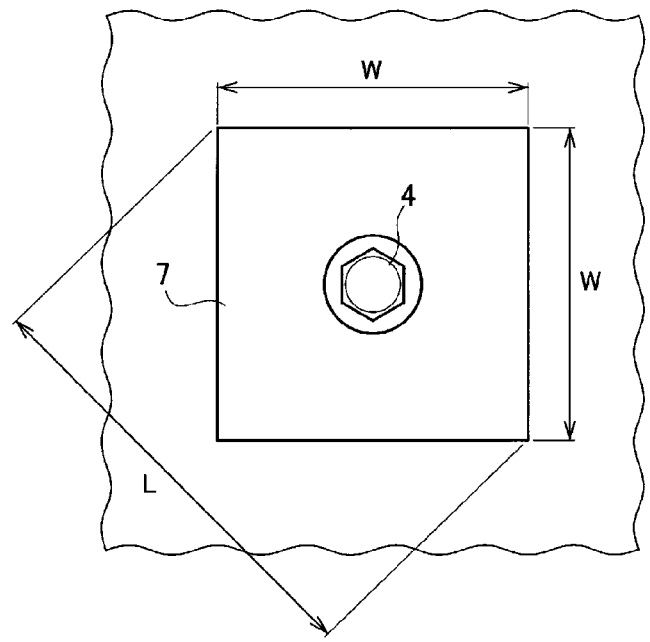
FIG. 7 is a diagram illustrating another example of the looseness detection structure illustrated in FIG. 1.
FIG. 7(b) is a diagram illustrating a resonance frequency spectrum.
Figure 7B:
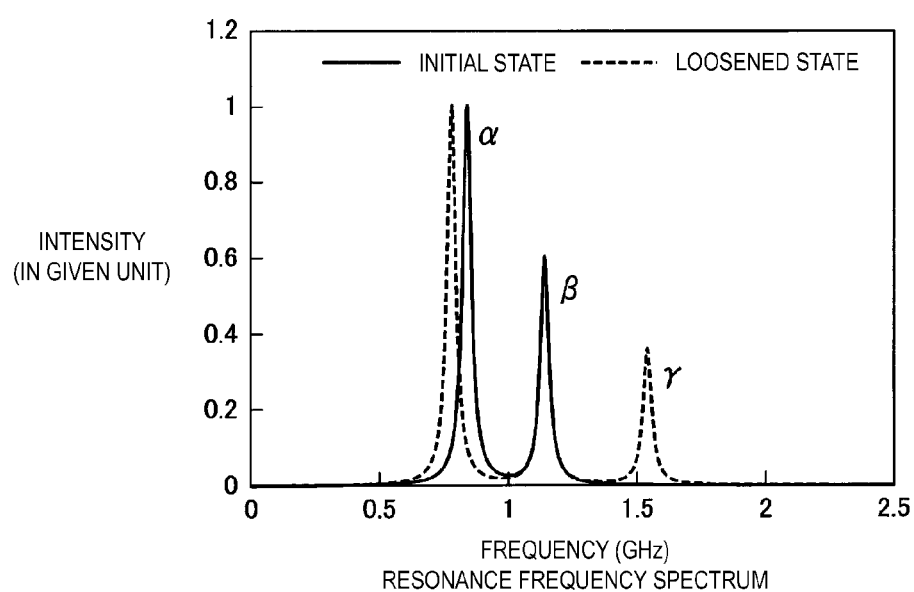

FIG. 7 is a diagram illustrating another example of the looseness detection structure 100. FIG. 7(a) is a plan view thereof, and FIG. 7(b) illustrates a power spectrum of a resonance frequency. In FIG. 7(b), a relation between the horizontal axis and the vertical axis is the same as that illustrated in FIG. 6(b).

The specific example illustrated in FIG. 7 differs from the specific example illustrated in FIG. 6 in that the diameter of the bolt 4 is increased. The diameter of the bolt 4 is equal to or larger than 1/50 (28.2 mm) of the diagonal line L, which is nearly equal to 14.1 cm.

In Specific Example 2, the diameter of the bolt 4 is larger than that of Specific Example 1, and thus the vibration at an antinode having a high amplitude is also inhibited. Thus, in a state in which the bolt 4 is fastened (a solid line in FIG. 7(b)), the third harmonic γ (the frequency 1.77 GHz at which resonance occurs with the diagonal line L being the wavelength λ), which can be observed in a case where the diameter of the bolt 4 is small, cannot be observed.

When the bolt 4 is loosened, the inhibited third harmonic γ newly appears (a broken line in FIG. 7 (b)). In this way, in a case where there is occurrence of a new peak value, it may be determined that there is looseness of the bolt 4 in the determination step S5.

On the other hand, the first harmonic α easily vibrate due to loosening of the bolt 4. As a result, the power spectrum of the first harmonic α slightly increases, and the frequency slightly decreases. In the determination step S5, the looseness of the bolt 4 may be determined based on a decrease in the frequency of the first harmonic α.

In such a case, in the determination step S5, for example, the bolt 4 may be determined to be loosened when the first harmonic of 0.84 GHz shifts to the low frequency side by 5% or more. The threshold of 5% is just a reference and a value corresponding to the measurement accuracy of the resonance frequency is used.

In this way, the amount of change in the peak value also includes the occurrence of a new peak value. In the determination step S5 described above, it is determined that there is looseness in a case where a new peak value has occurred. In this way, even in a case where the diameter of the bolt 4 is relatively large, the loosening of the bolt 4 can be correctly detected.

Specific Example 3

Figure 8A:
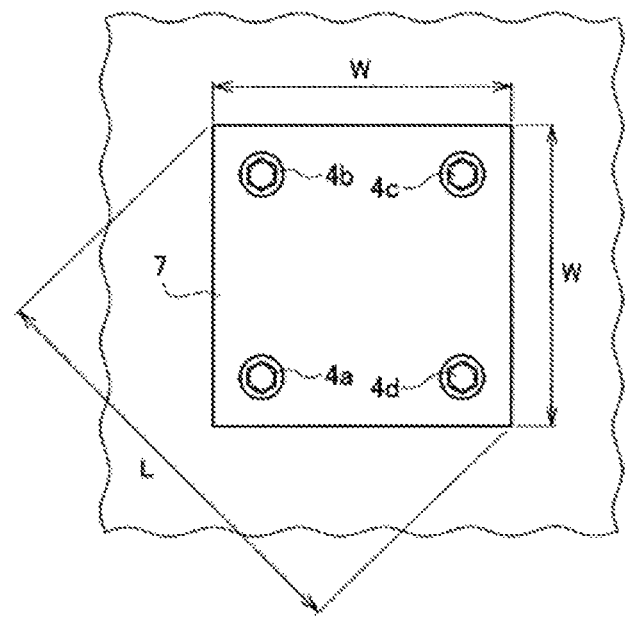
FIG. 8(a) is a plan view.
Figure 8B:
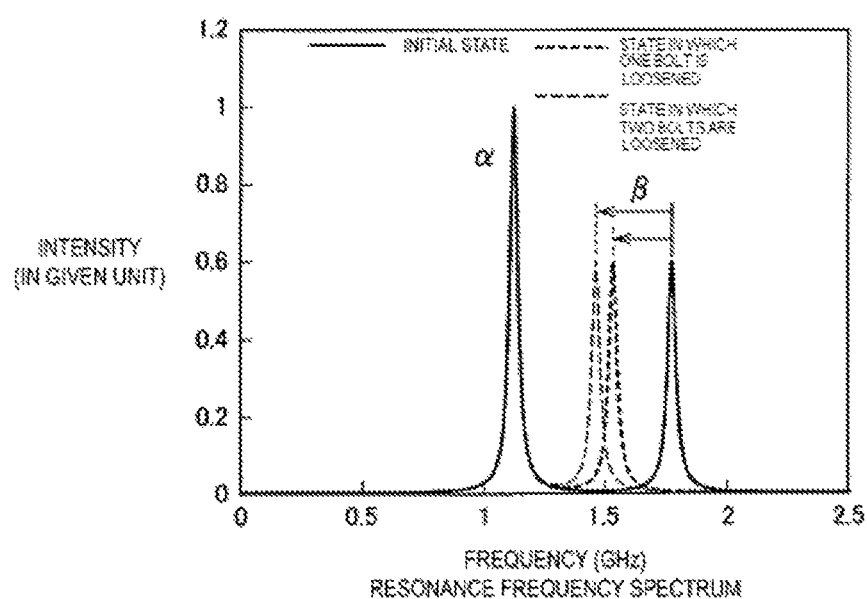
FIG. 8(b) is a diagram illustrating a resonance frequency spectrum.

FIG. 8 is a diagram illustrating further another example of the looseness detection structure 100. FIG. 8(a) is a plan view thereof, and FIG. 8(b) illustrates a power spectrum of a resonance frequency. In FIG. 8(b), a relation between the horizontal axis and the vertical axis is the same as that illustrated in FIG. 7(b).

The specific example of FIG. 8 differs from the specific examples described above in that four bolts 4 are provided, and that four corners of the conductive film 7 are fastened. In this case, a minimum frequency at which the power spectrum of the resonance frequency is acquired is set to include a frequency at which resonance occurs with the diagonal line L being a half wavelength λ/2 in a state in which all the bolts 4a, 4b, 4c, and 4d are loosened. A feed point at which a high-frequency signal is fed, for example, is a corner portion of the conductive film 7 on the side of the bolt 4b. In addition, the half wavelength λ/2 of the minimum frequency is preferably the length of the diagonal line L of the conductive film 7. Furthermore, a maximum frequency at which the power spectrum of the resonance frequency is acquired is preferably a frequency that is three or more times the minimum frequency.

In this example, the positions of the bolts 4a and 4c correspond to nodes of the vibration. Thus, for example, in a case where the diameter of each bolt 4 is smaller than 1/50 of the diagonal line L, the peak of the minimum frequency does not easily change even when the bolts 4a and 4c are loosened. Thus, the loosening of the bolt is detected using second and subsequent harmonics.

In the second and subsequent harmonics, the positions of all the bolts 4a to 4d correspond to antinodes of the vibration, and thus, when any one of the bolts 4a to 4d is loosened, the frequency of the second harmonic changes.

FIG. 8(b) illustrates this state. A change in the frequency of the second harmonic β when the bolt 4a is loosened is represented by a thick broken line. A change in the frequency of the second harmonic β when the two bolts 4a and 4d are loosened is represented by a thin broken line.

As illustrated in FIG. 8(b), when the bolt 4a is loosened, the frequency of the second harmonic β changes from 1.77 GHz to 1.53 GHz. In addition, when the two bolts 4a and 4d are loosened, the frequency of the second harmonic β changes from 1.77 GHz to 1.46 GHz.

In this way, the looseness detection structure 100 can detect looseness of a plurality of the bolts 4 as well. In addition, in a case where the diameter of each bolt 4 is equal to or larger than 1/50 of the diagonal line L, looseness of the bolt 4 has an influence on the minimum frequency even at the position of a node of the vibration due to the large diameter of the bolt. Thus, in a case where the diameter of the bolt 4 is equal to or larger than 1/50 of the diagonal line L, sweeping may be performed from frequencies including the minimum frequency.

As described above, according to the looseness detection structure 100 according to this embodiment and the looseness detection method using the structure, looseness of the bolt 4 fixing the two components is detected based on a change in the natural frequency of a detection target face of the two components. Thus, it is also appropriate to test a part that is difficult to visually check due to a test target being at a place at which it cannot be easily seen or far away.

A result of the test can also be quantitatively obtained. In addition, when the looseness detection structure 100 and the looseness detection device 200 are disposed apart from each other, looseness of the bolt can be detected remotely. It is only requested that the looseness detection structure 100 and the looseness detection device 200 be connected using a high-frequency signal line such as a micro split line. Furthermore, the looseness detection structure 100 and the looseness detection device 200 may be connected using a waveguide or the like.

In addition, it may be possible to dispose the looseness detection device 200 in the vicinity of the bolt 4 of an essential part of the structure and transmit a result of detection wirelessly. With this configuration, a risk accompanying the test can be excluded. In addition, the test cost can be reduced.

Figure 9A:
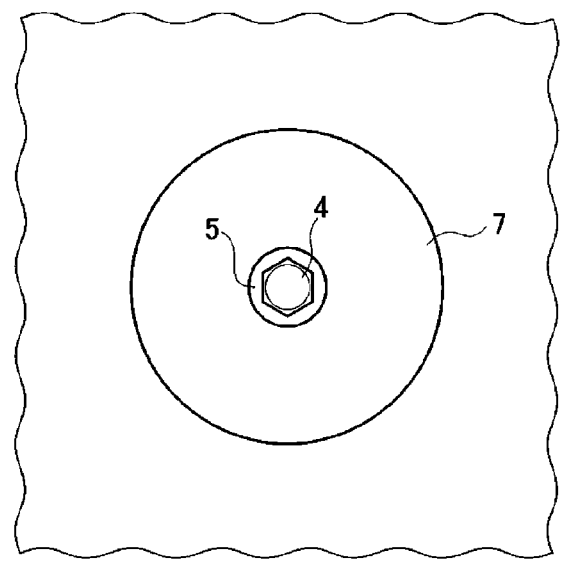
FIG. 9 is a diagram illustrating an example of another planar shape of a conductive film.
Figure 9B:
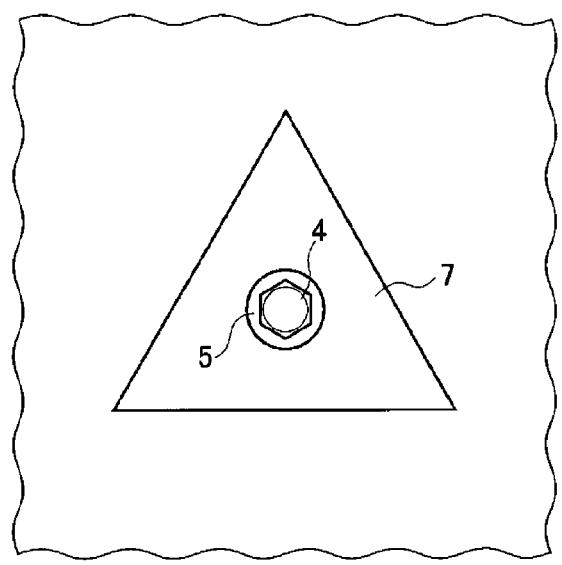

The looseness detection structure 100 of the present invention is not limited to Specific Examples 1 to 3 described above. The looseness detection structure 100 can be broadly applied to a structure in which the two components 1 and 2 are fixed with the bolt 4. In addition, although the planar shape of the conductive film 7 is a quadrangle in the above-described example, the shape is not limited thereto. As illustrated in FIG. 9, the planar shape of the conductive film 7 may be a circle (a) or triangle (b).

Thus, the present invention is not limited to the embodiments, and can be modified within the scope of the gist of the present invention.

REFERENCE SIGNS LIST 1, 2 Component
4 Bolt
5 Washer
6 Nut
7 Conductive film
8 Non-conductive film
9 Second conductive film
100 Looseness detection structure
20 Frequency sweeping unit
21 High-frequency applying unit
22 Vibration mode detecting unit
23 Vibration mode recording unit
24 Determination unit
25 Control unit

The invention claimed is:

1. A looseness detection structure configured to detect looseness between a bolt and a nut fixing two components, the looseness detection structure comprising:
a conductive film configured to be attached on a surface of a first component of the components, the surface of the first component including a hole into which the bolt is inserted, the conductive film being attached such that the conductive film is not directly conductive to the first component, a part of the conductive film having a dimension relating to a wavelength of a high-frequency signal propagating inside the components;
a non-conductive film between a surface of the first component and the conductive film in a case where surfaces of the components are conductors; and
a second conductive film on a surface of a second component of the components in a case where the surfaces of the components are insulators, the second conductive film being opposite to the conductive film.

2. The looseness detection structure according to claim 1, wherein
planar shapes of the conductive film and the second conductive film are quadrangles, and
a dimension of a diagonal line of each quadrangle is an integer multiple of a half wavelength of the high-frequency signal, or a dimension of one side of each quadrangle is an integer multiple of the half wavelength of the high-frequency signal.

3. A looseness detection method executed by a looseness detection device configured to detect looseness between a bolt and a nut, the looseness detection method comprising:
sweeping and applying a high-frequency signal at a frequency in a predetermined range to a conductive film configured to be attached on a surface of a first component of components, the surface of the first component including a hole into which the bolt is inserted, the conductive film being attached such that the conductive film is not directly conductive to the first component, a part of the conductive film having a dimension relating to a wavelength of the high-frequency signal propagating inside the components;
detecting a vibration mode of the first component to which the conductive film is attached;
recording a peak value of a vibration detected in the detecting;
comparing the peak value with the peak value in the past and obtaining an amount of change; and
determining that the looseness is not present in a case where the amount of change is smaller than a threshold and determining that the looseness is present in a case where the amount of change is equal to or larger than the threshold.

4. The looseness detection method according to claim 3, wherein
a planar shape of the conductive film is a quadrangle,
a dimension of a diagonal line of the quadrangle is an integer multiple of a half wavelength of the high-frequency signal, or a dimension of one side of the quadrangle is an integer multiple of the half wavelength of the high-frequency signal, and
in the sweeping and applying, a frequency range is swept, the frequency range including a frequency of the high-frequency signal at which the dimension of the diagonal line of the quadrangle corresponds to the half wavelength and a frequency that is three times the frequency.

5. The looseness detection method according to claim 3, wherein
the amount of change also includes occurrence of a new instance of the peak value, and
in the determining, it is determined that the looseness is present in a case where the new instance of the peak value occurs.

6. The looseness detection method according to claim 4, wherein
the amount of change also includes occurrence of a new instance of the peak value, and
in the determining, it is determined that the looseness is present in a case where the new instance of the peak value occurs.

* * * * *